United States Patent [19]

La Rocca

[11] Patent Number: 4,665,298
[45] Date of Patent: May 12, 1987

[54] APPARATUS FOR EFFECTING TREATMENT OF METAL WORKPIECES BY MEANS OF A POWER LASER

[75] Inventor: Aldo V. La Rocca, Moncalieri, Italy

[73] Assignee: Fiat Auto S.p.A., Italy

[21] Appl. No.: 767,539

[22] Filed: Aug. 20, 1985

[51] Int. Cl.$^4$ ............................................. B23K 26/00
[52] U.S. Cl. ......................... 219/121 L; 219/121 LT; 219/121 LQ; 219/121 LP
[58] Field of Search ..... 219/121 L, 121 LC, 121 LD, 219/121 LS, 121 LT, 121 LP, 121 LQ, 121 LR, 350, 383, 349

[56] References Cited

U.S. PATENT DOCUMENTS

| | | | |
|---|---|---|---|
| 3,460,930 | 8/1969 | Pityo | 219/121 LQ |
| 3,603,766 | 9/1969 | Kino et al. | 219/121 LQ |
| 3,621,198 | 11/1971 | Herbrich | 219/121 LQ |
| 3,757,078 | 9/1973 | Conti et al. | 219/121 LQ |
| 4,480,168 | 10/1984 | Cielo et al. | 219/121 LQ |

FOREIGN PATENT DOCUMENTS 0010495  1/1979  Japan ............................ 219/121 LP Primary Examiner—M. H. Paschall
Attorney, Agent, or Firm—Sughrue, Mion, Zinn, Macpeak, and Seas

[57] ABSTRACT

The apparatus comprises a laser radiation generator which directs a laser beam onto a workpiece to be treated, and a reflector capable of re-directing onto the workpiece undergoing treatment the radiation reflected and/or scattered by the piece. The reflector is formed in such a way as to cause the radiation reflected and scattered by the piece to be re-focused in a zone that is different from but adjacent the zone struck directly by the radiation emitted by the laser generator. In this way a pre-heating or a post-heating of the zone of the workpiece struck directly by the radiation emitted by the generator may be effected.

3 Claims, 1 Drawing Figure

U.S. Patent   May 12, 1987   4,665,298
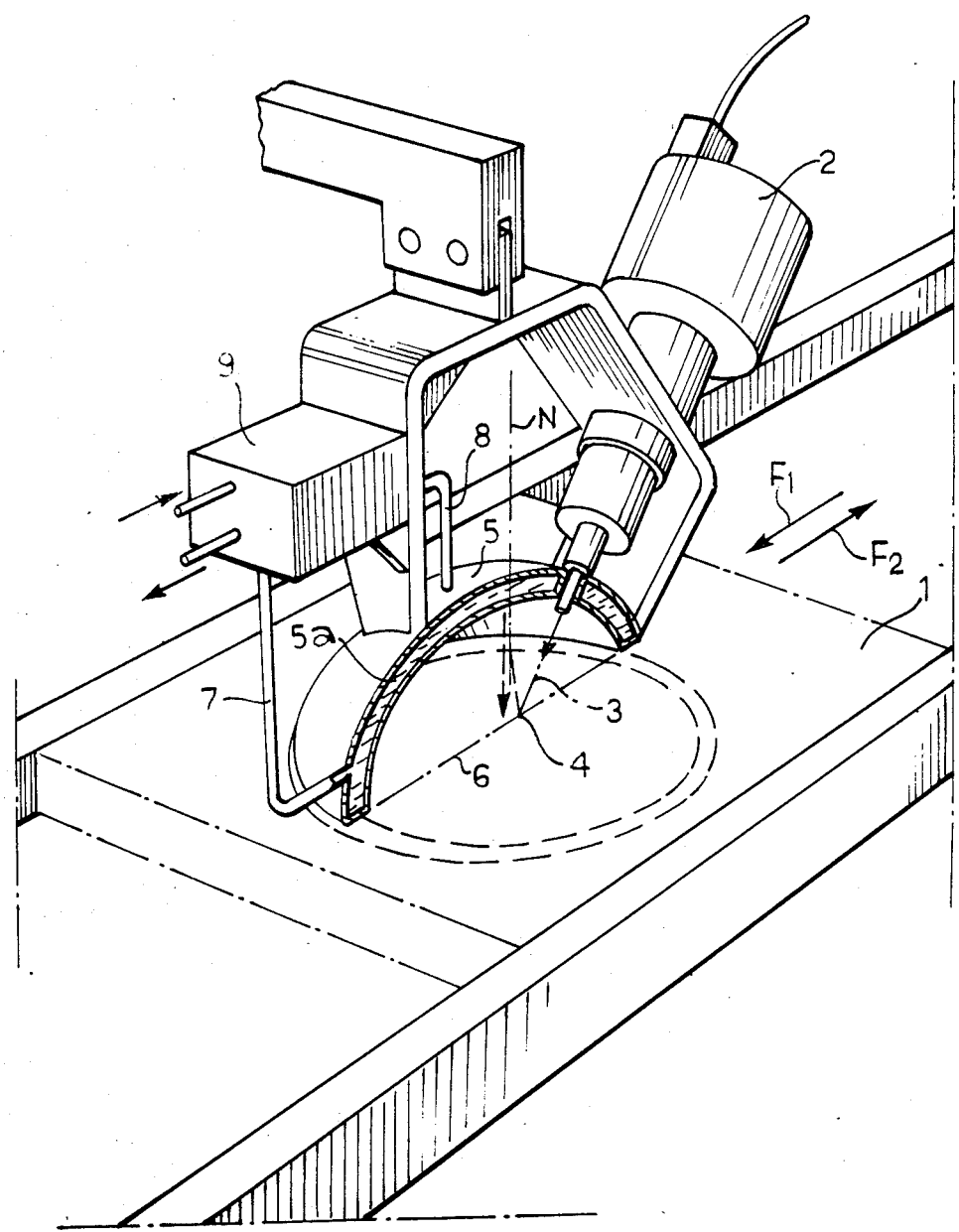

APPARATUS FOR EFFECTING TREATMENT OF METAL WORKPIECES BY MEANS OF A POWER LASER

FIELD OF THE INVENTION

The present invention relates to apparatus for carrying out treatment of metal workpieces by means of a power laser.

The term "treatment" is understood to cover particularly, although not exclusively, heat treatments such as cutting, welding, surfacing, alloying and surface hardening, with or without the addition of materials.

BACKGROUND OF THE INVENTION

According to the prior art for heat treatment of metal workpieces by means of a power laser, the laser beam directed onto the metal surface to be treated is, for the most part (60-80% approximately), reflected, and only a minor part (40-20% approximately) is absorbed by the material.

STATE OF THE PRIOR ART

In order to increase the radiation absorption capacity in hardening treatments, it has been proposed to blacken the surface to be treated by means of a preliminary operation, which consists of applying layers of a black paint, of lampblack or of another substance such as maganese phosphate. These operations permit of an improvement in the situation in the case of surface hardening treatments without the addition of material, but not to a satisfactory extent. Often, however, the coatings cause a deterioration in the metallurgical and mechanical properties of the workpieces treated.

In order to allow a substantially more favourable relationship to be achieved between the energy supplied by the laser generator and the energy effectively absorbed by the workpiece, it is proposed in U.S. Pat. No. 4,288,678 to use a reflector to re-direct onto the workpiece undergoing treatment the energy reflected by this piece. In particular, the energy reflected by the piece is re-directed onto the same zone of the piece upon which the radiation emitted by the laser generator impinges.

This technique effectively allows an improvement to be brought about in the energy efficiency of the treatment. This solution does not, however, eliminate any of the disadvantages that may accompany the phenomenon, in itself favourable, that very high thermal gradients are created in the region of the workpiece directly struck by the laser radiation. In the event of a transformation into the liquid phase there would be an accentuation of the convection currents in the molten metal, with possible evolution of "bubbles" of vapour issuing from the workpiece at the point struck by the laser radiation, if the latter is not uniform and hence creates localised overheating and vaporisation.

In addition, the heating phase is followed by a much more rapid cooling phase, and this may result in the "freezing" of ripples created in the treated surface by the effect of waves generated by excessive convection currents.

So as to allow sufficient time for the surface to relax, achieving at the limit "specular" flatness, it would be desirable to maintain the liquid in a state of sufficient mobility (low viscosiy) and, therefore, at a sufficiently high temperature and for a sufficiently long time to allow the said relaxation of the surface, under the action of gravity and of surface tensions.

OBJECT OF THE INVENTION

The object of the present invention is to provide apparatus for carrying out treatment of metal workpieces by means of a power laser, which apparatus allows the disadvantages of the prior art to be avoided.

DESCRIPTION OF THE INVENTION

In order to achieve the above object, the present invention provides apparatus for effecting treatment of metal workpieces by means of a power laser, comprising a laser radiation generator which focuses the laser beam onto the workpiece to be treated, and a reflector capable of directing onto the piece undergoing treatment the radiation reflected and scattered by the piece, characterised in that at least a portion of the surface of the reflector intended to be struck by the radiation reflected and scattered by the piece is shaped in such a way as to re-direct the radiation reflected by the piece into a zone that is different from, and adjacent, the zone struck directly by the radiation emitted by the generator.

The apparatus according to the invention allows, by means of the radiation re-directed onto the piece, a pre-heating and/or a post-heating to take place in the zone of the workpiece directly struck by the radiation emitted by the generator. The pre-heating has the advantage of ensuring that the area that is from time to time struck by the laser beam is already hot the: local temperature gradient is thus reduced, any power peaks in the beam are levelled out and hence the formation of convection currents and any possible generation of vapour from the metal melted at the points which would otherwise be overheated are limited.

There is hence achieved, among other things a reduction in the unevenness of distribution of the heat applied in the irradiated area (this has a sort of heat "integrating" effect) and an improvement in the operating conditions of the process, due to the fact that it is possible to reduce the initial intensity of the laser beam, by virtue of the greater intensity of the total radiation received by the workpiece. This in turn reduces the impulsive action which, through the aforesaid convection currents, results in the formation of a surface wave of molten material, this being the cause of the formation of surface ripples.

The post-heating, on the other hand, allows any irregularities on the final surface of the treated piece to be eliminated, since it facilitates the relaxation of the surface material.

Both the pre- and the post-heating advantageously allow the stresses within the piece undergoing treatment to be reduced and controlled, reducing the risk of formation of cracks, micro-cracks and pores.

DETAILED DESCRIPTION OF AN EMBODIMENT

The invention will now be described with reference to the appended drawing, which illustrates schematically, and purely by way of a non-limiting example, a method of carrying out the present invention.

In the example shown in the drawing, reference numeral 1 indicates a metal, workpiece to be treated and reference numeral indicates and a laser radiation generator which focuses a laser beam 3 at a point 4 on the surface of the workpiece 1.

As illustrated in the drawing, the laser beam 3 is inclined to the surface of the workpiece 1 to be treated. This beam is, in addition, preferably inclined to the normal N at the point 4 on the surface of the piece 1 to be treated. This inclination in practice prevents the workpiece 1 from reflecting a part of the radiation incident thereon back towards the laser source.

Reference numeral 5 indicates a reflector in the form of an ellipsoidal cap, with a first focal point substantially coinciding with the point 4 described above, and a second focal point 6 situated a short distance from the point 4. The eccentricity of the reflector 5 is fairly moderate.

The mirror 5 is fixed to the laser generator 2, and by virtue of its geometric characteristics it reflects the radiation reflected or scattered in any direction from the point 4 onto the point 6 on the surface of the workpiece 1.

If during the treatment the workpiece 1 is moved in the direction of the arrow $F_1$ relative to the generator 2 and to the mirror 5, the reflector 5 re-directs the reflected radiation into those points of the surface of the workpiece 1 already treated with the laser beam 3, and hence a post-heating is effected, which facilitates the relaxation of the surface material, relieving stress and improving the metallurgical state of the treated part.

If, on the other hand, during the treatment the workpiece 1 is displaced relative to the generator 2 and to the mirror 5 in the direction of the arrow $F_2$, this mirror re-directs the reflected radiation onto points which are to be struck by the laser beam 3, and hence effects a pre-heating, leading to a reduction of the local temperature gradient which, in the case of transformation into the liquid phase, is responsible for the generation of convection currents and of surface ripples. At the same time, uniformity of the power density of the beam is ensured, thus avoiding the generation and the possible evolution of "bubbles" of locally evaporated metal. Moreover, the combination of these effects prevents or reduces the creation of undesirable stresses and metallurgical states in the treated zone of the workpiece.

As illustrated in the drawing, the mirror 5 is preferably provided with a hollow interspace 5a in which there circulates a cooling fluid which is supplied through an inlet pipe 7 and is discharged through an outlet pipe 8. This fluid is cooled in a heat exchanger 9, which in the embodiment illustrated is carried by the same structure as that which supports the laser radiation generator 2.

In the case of variously shaped workpieces, the corresponding form of apparatus for recovery and re-direction of the reflected and scattered laser energy will consist of particular variants of the form described for the treatment of flat surfaces.

Furthermore the reflector described above with reference to the drawing may be embodied with a plurality of flat surfaces positioned in such a way as to ensure an acceptable approximation to the ellipsoidal shape. This solution can be achieved with much more simple machining processes. The flat surfaces composing the "psuedo-ellipsoidal" shape may finally be oriented in such a way as to re-direct the radiation onto two zones, respectively preceding and following the zone directly struck by the laser radiation. In this way both pre- and post-heating of the workpiece are effected.

I claim:

1. An apparatus for effecting treatment of metal workpieces by means of a power laser comprising support means for movably supporting the workpiece to be treated, a reflector in the form of an ellipsoidal cap having a pair of spaced apart focus points, said cap being mounted-adjacent said support means with said focus points being positioned on the surface of the workpiece supported by said support means and a laser radiation generator for directing a beam directly onto the surface of a workpiece being treated at one of said focus points whereby radiation reflected and scattered by the workpiece will be redirected by said reflector to said second focus point.

2. An apparatus as set forth in claim 1 wherein said reflector is provided with an aperture through which said laser beam from said laser radiation generator is directed.

3. An apparatus as set forth in claim 1 wherein said ellipsoidal cap is oriented relative to said support means with said two focus points being disposed along the line of movement of a workpiece on said support means.

* * * * *

UNITED STATES PATENT AND TRADEMARK OFFICE
CERTIFICATE OF CORRECTION

PATENT NO. : 4,665,298

DATED : May 12, 1987

INVENTOR(S) : Aldo V. LaRocca

It is certified that error appears in the above-identified patent and that said Letters Patent is hereby corrected as shown below:

On the title page Insert

-- Foreign Application Priority Data
Aug. 20, 1984    Italian Patent Appl. No.   67834-A/84 --.

Signed and Sealed this

Eighth Day of December, 1987

*Attest:*

DONALD J. QUIGG

*Attesting Officer*  Commissioner of Patents and Trademarks